United States Patent Office 3,227,573
Patented Jan. 4, 1966

3,227,573
SURFACE TREATMENT OF BITUMINOUS
MATERIALS
William N. Axe and Armin C. Pitchford, Bartlesville, Okla., assignors to Phillips Petroleum Company, a corporation of Delaware
No Drawing. Filed Aug. 28, 1961, Ser. No. 134,139
12 Claims. (Cl. 117—32)

This invention relates to the surface treatment of bituminous materials. In one aspect this invention relates to the surface treatment of bituminous materials to inhibit deterioration of said materials due to aging.

Bituminous materials such as asphalt, coal tars, and the like are widely used in the roofing industry and in paving applications such as roadways and airfield runways, and in other applications. In such uses the surface of the bituminous material is exposed to environmental factors such as sunlight, oxygen in the air, heat from the sunlight, and atmospheric cold. This exposure results in deterioration of the surface by a process involving a combination of effects and referred to generally as aging. The aging process is complex. However, it is generally considered that surface oxidation is one of the more important factors. Said surface oxidation produces a film containing a molecular structure that tends to shrink and thus cause cracking. Upon the formation of cracks more surface is exposed and the process is repeated. If deterioration of the surface could be inhibited, then the main body of the bituminous material would retain its original properties for a much longer time.

We have discovered that deterioration of bituminous materials due to aging can be inhibited by treating the surface of said materials with an organic peroxide. Thus, broadly speaking, the present invention resides in treating the surface of a bituminous material with an organic peroxide under conditions such that said peroxide reacts with the surface of said material to provide improved surface properties without modifying desirable characteristics of the remaining body of the bituminous material.

An object of this invention is to provide a method for treating the surface of a bituminous composition. Another object of this invention is to provide a process for modifying the surface of bituminous compositions to provide improved surface properties without modifying the gross properties of the total bituminous composition. Another object of this invention is to provide a process for inhibiting the aging of a bituminous composition caused by surface exposure. Still another object of this invention is to provide a process for treating the surface of a bituminous composition with an organic peroxide to inhibit aging of said composition. Other aspects, objects, and advantages of the invention will be apparent to those skilled in the art in view of this disclosure.

Thus, according to the invention, there is provided a method for increasing the resistance to aging of a bituminous material which comprises: uniformly applying to the surface of said material an organic peroxide; and subjecting said thus treated bituminous material to sufficient heat for a period of time sufficient to cause said peroxide to react with the surface of said material.

The process of the invention is applicable in any situation where surface exposure causes deterioration of a bituminous composition. As used herein and in the claims, unless otherwise specified, the term "bituminous composition" or "bituminous material" includes asphalts such as petroleum asphalts prepared from cracked or uncracked petroleum residues, and natural asphalts such as Trinidad asphalt, other natural mixtures of hydrocarbons referred to as pitch or bitumens, coal tar or coal tar pitch such as gas works coal tar, coke oven coal tar, blast furnace coal tar, and producers gas coal tar. Such materials comprise mixtures of high boiling hydrocarbons having various carbon to hydrogen ratios, and including in some instances, sulfur containing compounds, nitrogen containing compounds, and oxygen containing compounds. Such bituminous materials are frequently defined in terms of their asphaltenes content, resin content, and oils content.

Any suitable organic peroxide which decomposes at usable rates, at the conditions under which the invention is practiced, to furnish free radicals can be used in the practice of the invention. As used herein and in the claims, unless otherwise specified, the term "organic peroxide" is used generically and includes both organic peroxides and organic hydroperoxides. Suitable organic peroxides for use in the practice of the invention are those which have a half-life in the range of 15 minutes to 500 hours under the conditions at which the treating method of the invention is carried out. More preferred organic peroxides are those which have a half-life in the range of about 15 minutes to about 100 hours under the conditions at which the surface treatment of the invention is carried out. One skilled in the art can easily determine which organic peroxides are within the above stated ranges by determining the half-life of a peroxide in a benzene solution of 0.2 gram mol of perioxide group (—O—O—) per liter of benzene as explained in the article "Evaluation of Organic Peroxides on the Basis of Half-Life Data," by D. F. Doehnert and O. L. Mageli in Modern Plastics, February 1959, pages 142, 144, and 146–148. Representative examples of organic peroxides suitable for use in the practice of the invention include, among others, the following: di-tert-butyl peroxide; tert-butyl hydroperoxide; benzoyl peroxide; tert-butylbenzene hydroperoxide; dicumyl peroxide; hydroxyheptyl peroxide; cyclohexanone peroxide; t-butyl peracetate; di-t-butyl diperphthalate; t-butyl perbenzoate; methyl ethyl ketone peroxide; p-menthane hydroperoxide; pinane hydroperoxide; 2,5-dimethylhexane-2,5-dihydroperoxide; cumene hydroperoxide; lauroyl peroxide; and the like.

The amount of organic peroxide utilized in the practice of the invention can vary widely depending upon such factors as the degree of inhibition of the aging process desired, the specific nature of the bituminous material being treated, and the specific conditions under which the surface treatment of the bituminous material is carried out. Very small amounts have been found to be beneficial. There is really no upper limit on the amount of organic peroxide which can be utilized except that imposed by economic considerations. Usually the amount of organic peroxide utilized is between 0.0005 to 0.05 pound mol per 1,000 square yards of surface being treated. However, amounts up to 0.5 pound mol, or higher, can be used where economic conditions permit.

The method of the invention is practiced by uniformly distributing or applying the organic peroxide on the surface of the bituminous composition and causing said peroxide to react with the bituminous composition at the surface thereof to produce a surface which is resistant to aging. Any suitable method for distributing or applying said peroxide can be employed. The organic peroxide can be applied as a finely divided or powdered solid, or in solution in a suitable solvent. When applied as a solid, any suitable method can be employed for distributing a thin film of the finely divided solid over the surface of the bituminous composition. The actual method of distributing the finely divided solid will depend, in most instances, upon the amount of surface to be treated. For treating relatively small surfaces hand operated dusting machines can be employed. For larger surfaces mobile dusting machines can be employed. For even larger surfaces such as highways or airport runways, airplanes utilizing the familiar airplane crop dusting techniques can be employed.

In situations where it is not feasible to apply the organic peroxide as a finely divided solid, one can dissolve said peroxide in a suitable volatile solvent which is chemically inert, i.e., non-reactive with the peroxide or the bituminous material under the conditions of the treatment. The solvent is preferably one in which the bituminous material is substantially insoluble. However, when the organic peroxide is applied in the form of a solution a minimum amount of solvent is used. Relatively concentrated solutions of the peroxide are preferred, e.g., solutions approaching the saturation point. The solution is sprayed onto the surface of bituminous material as a thin film which is insufficient to dissolve the bituminous material. In other words, the surface is just wetted with the solution, not washed. Thus, the solubility of the bituminous material in the solvent used to apply the organic peroxide is not, in most instances, critical.

Examples of suitable volatile solvent which are chemically inert under the treating conditions and which can be employed in the practice of the invention include, among others: the low boiling ketones such as acetone and methyl ethyl ketone; the low boiling alcohols such as ethanol, isopropyl alcohol, and butanol; low boiling hydrocarbons and mixtures thereof such as petroleum ether, the various pentanes, the various hexanes, the various heptanes, and gasolines; and benzene and other similar solvents.

Reaction between the bituminous material and the organic peroxide will take place under ordinary conditions of warm, sunny weather. It has been found that the top ¼ inch of an asphalt pavement or bituminous roofing material will frequently reach temperatures in the order of 150 to 175° F. on a hot, sunny day. The reaction can be speeded up if desired by heating the sprayed or dusted surface of the bituminous material with a hot roller or by application of radiant heat such as that from a flame, heat lamp, or any other suitable source. In paving operations, the application of the organic peroxide to the surface of the pavement can be the last step in the paving operation and thus utilize the heat remaining in the asphalt after it has been rolled for what would normally be the last time. If desired, the thus treated asphalt pavement can be rolled again after application of the peroxide in order to bring said peroxide into more intimate contact with the surface. Thus, any suitable source of heat and/or method of applying heat can be employed in the practice of the invention.

As indicated above, the time of the reaction varies with the temperature, higher temperatures shortening the reaction time and vice versa. Usually temperatures within the range of from about 100 to about 350° F. are employed. In treating large surfaces, it is usually preferred to use peroxides which have relatively low decomposition temperatures because such peroxides will react more rapidly at a given temperature than those having higher decomposition temperatures. In selecting the particular peroxide to be employed one can be guided by the half-life of the available peroxides, the treating times available for carrying out the reaction between the bituminous material and said peroxide, the amount of heat which it is desired to apply, and the method of applying said heat. As is well known to those skilled in the art, the half-life of an organic peroxide decreases with increasing temperature. Thus, one can vary the time of treatment with a given peroxide by varying the temperature at which the treatment is carried out. In some instances, such as when treating a large surface such as a long strip of highway pavement under favorable weather conditions including a hot, sunny day, and when it is expected that sunny weather will extend over a period of several days, one can extend the time of treatment over several days by selecting an organic peroxide having a half-life in the order of 50 hours or longer.

While it is not intended to limit the invention by any theory of the reaction mechanism involved in the surface treatment of the bituminous composition with an organic peroxide, it is presently believed that the beneficial effect of the invention is obtained by the free radicals formed upon the decomposition of the organic peroxide reacting with active hydrogen sites in the resin fraction of the bituminous material to preserve the resin content of said bituminous material by preventing conversion of the resins to asphaltenes as occurs in the aging process. The deterioration which occurs upon exposure of the surface of a bituminous material is believed to be due to a combination of polymerization and oxidation reactions which convert the resins in the bituminous material to asphaltenes. When organic peroxides are used to treat the surface of the bituminous materials in accordance with the invention, said peroxides decompose to form free radicals which in turn apparently react with active hydrogen sites in the resin fraction and thus make said active hydrogen sites unavailable for the polymerization and/or oxidation reactions which form asphaltenes. The organic peroxide thus apparently causes polymerization to a relatively inactive resin which results in the preservation of the resin content and therefore maintains the desirable properties of the bituminous material over a longer period of time. The invention thus modifies the surface of the bituminous material by removing therefrom the active polymerization and/or oxidation sites which would otherwise tend to form asphaltenes or asphaltene-like materials.

The following examples will serve to further illustrate the invention.

EXAMPLE I

A brass plate was coated with a layer of a 85–100 penetration commercial paving asphalt made by the vacuum reduction of Rangley crude oil. The coating of said asphalt on said plate was from approximately 1/16 to 1/8 inches in thickness. The coated plate was allowed to cool to room temperature and a thin film of dry powdered dicumyl peroxide was applied to the surface of the asphalt. The thus coated asphalt plate was then placed under an infrared heat lamp at a distance of about 6 to 8 inches from said lamp. Upon application of heat reaction took place, slowly at first, and more rapidly as the temperature increased, as evidenced by the decomposition of said peroxide. It was evident that the surface of the asphalt had been modified.

EXAMPLE II

A sample of the 85–100 penetration asphalt used in Example I was melted and 2 weight percent (based on the asphalt) of dicumyl peroxide incorporated therein. The resulting mixture was then maintained at a temperature of 210–215° F. for a period of 64 hours. A control sample of the same asphalt, containing no dicumyl peroxide, was also maintained at 210–215° F. for 64 hours. Both of the resulting products were analyzed for asphaltene content, resin content, and oils content. The results of said analyses and a comparison with a like analysis on the original asphalt are set forth in Table I below.

*Table 1*

|  | Original untreated Asphalt | Control Sample [1] | Peroxide treated Asphalt |
|---|---|---|---|
| Asphaltenes, wt. percent | 18.8 | 20.7 | 19.5 |
| Resins, wt. percent | 19.9 | 17.1 | 19.8 |
| Oils, wt. percent | 60.4 | 62.2 | 60.9 |

[1] No peroxide treatment, heated only.

The above data show that less resins were converted to asphaltenes in the sample which contained the dicumyl peroxide than in the control sample which contained no peroxide. This indicates that the dicumyl peroxide exerted a stabilizing effect on the resin fraction by preventing polymerization and/or oxidation to asphaltenes by, or through, the active hydrogen sites of said resins. The net effect is a preservation of the resin content of the asphalt.

EXAMPLE III

An aging index was determined on the sample of asphalt from Example II which had been treated with the dicumyl peroxide. An aging index was also determined on a sample of the original untreated asphalt from Example II.

The aging index of bituminous material is defined as the ratio of its viscosity at 77° F. after aging to its viscosity at 77° F. before aging. Said viscosities are absolute viscosities and are determined on aged and unaged samples of 10 to 100 microns thickness disposed between two matched glass plates and employing a sliding plate microviscometer. Aging is accomplished by heating a film of sample about 5 microns in thickness in air for 2 hours at 225° F.

The results of said aging tests are set forth in Table II below.

*Table II*

|  | Original untreated Asphalt | Peroxide treated Asphalt |
|---|---|---|
| Viscosity before aging, 77° F., poises at 0.05 sec.$^{-1}$ | $1.59 \times 10^6$ | $5.15 \times 10^6$ |
| Viscosity after aging, 77° F., poises at 0.05 sec.$^{-1}$ | $5.65 \times 10^6$ | $9.05 \times 10^6$ |
| Aging index: Viscosity after aging/Viscosity before aging | 3.55 | 1.76 |

The results of the above aging tests show that the sample treated with dicumyl peroxide has a higher viscosity than that of the untreated asphalt. This increase is due primarily to the hardening effect resulting from the peroxide treatment. However, the age index definitely shows that the dicumyl peroxide pretreatment of the asphalt retarded the thin film aging by a factor of 2.

The aging tests and viscosity determinations described in the above Example III were determined by employing a Hallikainen sliding plate viscometer, manufactured by the Hallikainen Instrument Company, 1341 Seventh Street, Berkeley 10, California. Briefly, the method is as given below.

In determining the viscosity before aging the samples are heated in an oven, maintained at a temperature of not over 325° F., until the sample reaches a temperature between 250 and 300° F. Prolonged exposure of the sample to this high temperature range should be avoided. After melting, the samle is stirred thoroughly until it is homogeneous and free from air bubbles. A drop of the melted sample is placed on one of a pair of cleaned, dried, and weighed glass viscosity plates which have been weighed to the nearest 0.1 milligram. The drop of sample is then covered with the other plate and by using an infrared heat lamp is again melted and the plates pressed together and worked to form a uniform layer therebetween as judged by viewing in transmitted light. After forming the film, the plates are allowed to cool to room temperature and any excess asphalt on the edges of the plates is removed with a razor blade. The plates are then wiped with a cloth dipped in benzene and weighed to the nearest 0.1 milligram. The thickness of the film between said plates is calculated by the following formula:

$$\text{Film thickness } \mu = \frac{10^4 W}{Lwd}$$

$$= \frac{10^4 W}{6.00} = 1667 W$$

where:

$d$=density of sample, g./cc. (for most asphalts assume $d=1$), $L$ and $w$=length and width of the glass plate, centimeters (recommended plates, $L=2.00$ and $w=3.00$), $W$=weight of sample, grams.

The plates are then placed in a water bath maintained at $77 \pm 0.1°$ F. associated with the viscometer, and about 5 minutes is allowed for said plates to come to the bath temperature. In placing said plates, one of the plates is clamped to the viscometer frame and the other of the plates is attached to a device comprising a relatively simple balance beam pivoted on agate bearings and polished steel knife edges. By the use of four different loads on the balance beam, the viscosity of the sample is determined at four shear rates which bracket the desired test shear rate; the largest weight should be about 5 to 10 times as large as the smallest weight used. Selection of the weights to be used is governed by a suggested range of loads for different penetration grades of asphalt. For an 85–100 penetration asphalt the suggested range of loads, in grams, at 77° F., is 100 to 1000 grams. At temperatures above 50° F. the standard shear rate is normally 0.05 sec.$^{-1}$. Placing of the weights on the balance beam will cause movement of the plate attached thereto relative to the fixed plate. An electronic circuit is used to follow the movement of the sliding plate by controlling a simple servo motor. This motor drives an insulated metric micrometer and causes it to maintain a high resistance contact with a flag attached to the sliding glass plate. Movement of said sliding glass plate is recorded by the use of a suitable millivolt recorder or by reading the micrometer as a function of time.

The application of the four chosen weight loads is as follows: first apply the highest load chosen by adding a weight to the weight holder on the beam and note the displacement of the micrometer as a function of time by reading the micrometer or as shown graphically on the millivoltmeter recorder; then apply the next smaller load and so on until the four loads have been used. It is usually possible to make a single viscosity determination with a 100 micron movement; therefore, a total movement 500 microns should be sufficient for four shear rates. In no case should the total movement exceed 1500 microns as this changes the effective area of the sample. More detailed instructions for measuring the viscosity are given in the instruction manual supplied with the viscometer.

The shearing stress for each load and the shear rate for each resulting plate movement are calculated by means of the following equations:

$$\text{Sheer stress, dynes/cm.}^2 = \frac{980 F}{A}$$

$$= 163.3 \times F$$

$$\text{Shear rate, sec.}^{-1} = \frac{P}{St}$$

where:

$A$=area of the plate, square centimeters,
$F$=weight applied at the loading area, grams,
$P$=measured plate movement, microns,
$S$=film thickness, microns, and,
$t$=time, seconds, corresponding to the plate movement.

The viscosity for each load is calculated from the formula $$\text{Load viscosity, poises} = \frac{\text{sheer stress}}{\text{sheer rate}}$$

The viscosity of the sample at the desired shear rate (usually 0.05 sec.$^{-1}$ for tests at 77° F.) is determined by plotting log shear rate versus log load viscosity, drawing the best straight line through the points, and reading the viscosity from said line at the desired shear rate.

In preparing specimens for aging, the sample is melted as described above and a film of material having a thickness of 9 to 11 microns between two aging plates is prepared by the weight method described above. After preparation of the film between said plates, the plates are warmed with an infrared lamp and the upper plate is separated from the lower plate. This results in a film of about 5 microns thickness on each plate. The separated plates are then placed near the outer edge of a revolving shelf in an oven which is maintained at 225±2° F. The shelf is revolved at 5 to 6 r.p.m. during the two hour aging period. At the end of said two hours, the plates are removed from the oven, the sample is scraped therefrom with a razor blade, and transferred to a clean, dry, weighed viscosity plate.

To determine the viscosity of the sample after aging, a film having a thickness of 10 to 100 microns is prepared by the weight method described above. After preparation of the film the plates are allowed to cool in air for one hour and the viscosity at 77° F. on the aged sample is determined as described above by bracketing the standard shear rate of 0.05 sec.$^{-1}$.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A method for increasing the resistance to aging of a solid bituminous material which comprises: uniformly applying to the surface of said material an organic peroxide; and subjecting said thus treated bituminous material to sufficient heat for a period of time sufficient to cause said peroxide to react with the surface portion only of said bituminous material to provide improved surface properties without modifying desirable properties of the remainder of said bituminous material.

2. The method of claim 1 wherein said organic peroxide is dicumyl peroxide.

3. The method of claim 1 wherein said organic peroxide is benzoyl peroxide.

4. The method of claim 1 wherein said organic peroxide is di-tert-butyl peroxide.

5. The method of claim 1 wherein said organic peroxide is lauroyl peroxide.

6. The method of claim 1 wherein said organic peroxide is cumene hydroperoxide.

7. A method for treating the surface of a solid bituminous material and thereby increasing its resistance to aging, which method comprises: dissolving an organic peroxide in a volatile solvent which is chemically inert under the treating conditions to form a solution; uniformly spraying said solution onto said surface to coat same; and subjecting said coated surface to sufficient heat for a period of time sufficient to cause said peroxide to react with the surface portion only of said bituminous material to provide improved surface properties without modifying desirable properties of the remainder of said bituminous material.

8. A method for treating the surface of a solid bituminous material and thereby increasing its resistance to aging, which method comprises: uniformly spreading a thin layer of a finely divided solid organic peroxide onto said surface to coat same; and subjecting said coated surface to sufficient heat for a period of time sufficient to cause said peroxide to react with the surface portion only of said bituminous material to provide improved surface properties without modifying desirable properties of the remainder of said bituminous material.

9. A method for treating the surface of a solid bituminous material and thereby increasing its resistance to aging, which method comprises: uniformly and intimately applying to said surface an organic peroxide in an amount within the range of 0.0005 to 0.5 pound mol per 1000 square yards of said surface; and subjecting said surface to sufficient heat for a period of time sufficient to cause said peroxide to react with the surface portion only of said bituminous material to provide improved surface properties without modifying desirable properties of the remainder of said bituminous material.

10. The method of claim 9 wherein said peroxide is uniformly and intimately applied to said surface in the form of a solution in a volatile solvent which is chemically inert under the treating conditions.

11. The method of claim 9 wherein said bituminous material is a solid asphalt pavement.

12. The method of claim 9 wherein said bituminous material is a solid roofing material.

References Cited by the Examiner

UNITED STATES PATENTS

| | | | |
|---|---|---|---|
| 2,481,370 | 9/1949 | Van Den Berge | 117—92 |
| 2,560,650 | 7/1951 | Kronstein | 208—44 X |
| 2,684,305 | 7/1954 | Quilivan | 117—33 |
| 2,804,833 | 9/1957 | Berry | 117—92 |
| 2,868,672 | 1/1959 | Johnson et al. | 117—168 |
| 2,970,066 | 1/1961 | Brasure | 117—118 |

WILLIAM D. MARTIN, *Primary Examiner.*

RICHARD D. NEVIUS, *Examiner.*